Sept. 1, 1925.

F. E. COMSTOCK 1,552,038

FISHING REEL

Filed Sept. 19, 1922

Frederick E. Comstock  Inventor

H. S. Amstutz

By

Attorney

Patented Sept. 1, 1925.

1,552,038

UNITED STATES PATENT OFFICE.

FREDERICK E. COMSTOCK, OF VALPARAISO, INDIANA.

FISHING REEL.

Application filed September 19, 1922. Serial No. 589,133.

*To all whom it may concern:*

Be it known that I, FREDERICK E. COMSTOCK, a citizen of the United States, residing at Valparaiso, in the county of Porter and State of Indiana, have invented certain new and useful Improvements in Fishing Reels, of which the following is a specification.

My invention relates to improvements in fishing reels and it more especially consists of the features hereinafter pointed out in the annexed claims.

The purpose of my invention is to provide a fishing reel that will insure an easy control so that the line will wind on the reel in an even manner; that is extremely simple in construction and positive in action; that avoids the complexity of so-called automatic level winding reels; that can be easily adjusted to varying positions of line guides; that prevents crowding of the line adjacent the reel heads; and that automatically holds the reel in one of the two adjustable positions so that the thumb of the operator need only swing the reel on its pivot in one direction.

With these and other ends in view, I illustrate in the accompanying drawing such instances of adaptation as will disclose the broad underlying features without limiting myself to the specific details shown thereon and described herein.

Figure 1:
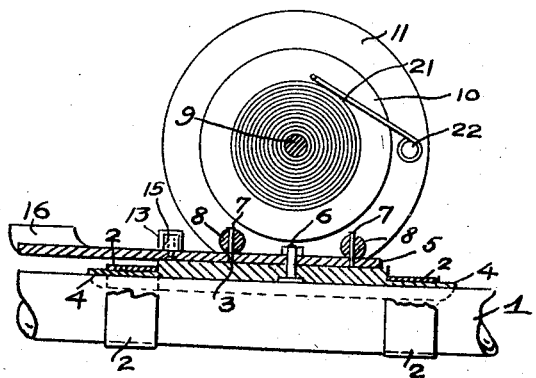
Figure 1 is a side elevation in section of a reel attached to a pole.

In practically carrying out my invention, any desired type of fishing pole 1 provided with slidable holding rings 2 may be used. A reel base 3 has endwise projecting toes 4 over which the rings 2 slide to hold the reel in position on the pole. On top of the base 3 a reel support 5 is pivoted on any suitable desired pivot pin or screw 6 placed directly beneath the reel center. The support 5 is secured to the tie rods 8 of the reel by rivets 7, or otherwise, so as to become quite rigid with the reel frame itself. The support 5 terminates in a thumb end 16 by means of which the entire reel is swung on a horizontal plane around pivot 6, as shown by the dotted lines in Fig. 2, due to the fact that the tie rods 8 support the reel heads 11. The spindle 9 and its heads 10 have free movement between the reel heads 11 under the control of the reel crank 12.

Figure 2:
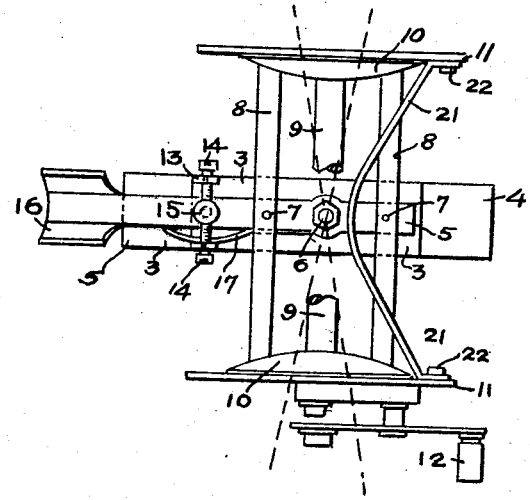
Fig. 2 is a plan view of a detached reel.
Figure 4:
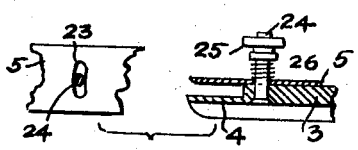
Fig. 4 is a combined plan and side elevation of an anti-rattle or tension device.
Figure 3:
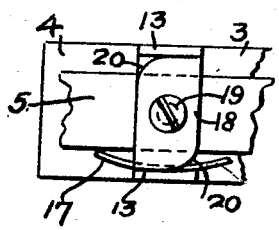
Fig. 3 is a plan view of a modified form of adjustment.

It is quite obvious that a change in horizontal angle of the reel axis to the center line of the pole will cause the line to travel endwise of the spindle. As the line is being rewound the operator simply shifts the angle of the reel by means of the thumb piece 16 so as to cause the line to wind on the spindle 9 in one direction. As soon as the line has traversed the spindle the thumb piece 16 is released and a spring 17 automatically shifts the reel to its opposite position which causes the line to wind on the spindle so as to traverse toward its other end. In order that the movement of the reel in either direction may be within definite limits ears 13 are formed on the base 3 on each side of the support 5, as shown in Figs. 2 and 3. These ears may have stop screws 14, as shown in Fig. 2, or they may be quite plain, as shown in Fig. 3. In the former case the set screws 14 cooperate with an upstanding pin 15 secured to the support 5. By adjusting the screws 14 the reel is given a greater or less movement. When once adjusted the set screws need not be changed unless the reel is used on another pole in connection with differently positioned line guides. In Fig. 3 the adjustment is made by means of a cam plate 18 that has cam ends 20. The plate is adjusted for different degrees of reel movement by loosening the screw 19 and swinging the plate 18 as far as desired, after which the screw 19 is again tightened. It is of course obvious that any desired means may be used to definitely confine the reel movements within fixed limits.

In order that the crowding of the line against the spindle heads 10 can be avoided, I may use a line guide 21 pivoted to the reel heads 11 at 22. The relation of this guide is clearly shown in Figs. 1 and 2. It may be formed of any desired shape as found needful in actual practice.

From the description it will be seen that my reel is exceedingly simple to construct and very simple to operate. In fact, its very simplicity is an outstanding feature, in view of the complexity embodied in devices of this kind ranging all the way from automatic to manual control found in present day actual practice.

My invention is not limited to any specific style or type of reel because it may be adapted without material change to any existing type of reel by simply substituting my improved form of support and base for any other base with which a reel may be equipped.

In order that all rattle, etc., may be eliminated and a tension applied onto the support 5, I may secure a threaded pin 24 in the base 3 so as to project through a slot 23 formed in the support. Above the support a coil spring 26 is placed and an adjusting thumb nut 25 is threaded on the pin. By turning the thumb nut, tension is placed on the support, which prevents rattle and the working relation of springs 17 and 26 can be easily made.

What I claim is:

1. In winding controls for fishing reels, a suitable reel frame, a winding spindle thereon, a support for the reel frame terminating in a thumb piece, a base under the support, means for pivoting the support to the base in line with the reel center, and adjustable means for limiting the displacement of the support and the base with respect to each other.

2. In fishing reels, an under support for the reel, a base pivoted to the support so as to admit of free horizontal movement of the reel on said pivot, and means for limiting such movement over a very small angle positively in one direction and selectively in the other direction.

3. In fishing reels, an under support for the reel, a base pivoted to the support so as to admit of horizontal movement of the reel around said pivot, means for limiting the reel movement, means for automatically producing movement of the reel in one direction, and means for manually moving the reel in the other direction.

4. In fishing reels, a reel support, a base therefor, means for pivoting the support to the base, and cooperating means for positively limiting the displacement between the support and the base in one direction and elastically in the other direction.

5. In fishing reels, a reel frame, a line spindle pivoted in the frame, and a line guide curving toward the spindle and having its ends pivoted on the inside of the heads of the reel frame.

6. In fishing reels, a reel frame, a support secured thereto, a base pivoted to the support, means for positively limiting the free movement of the reel frame in one direction and yieldingly limiting it in the other direction, and projecting toes on the base by means of which the reel is held on a pole.

In testimony whereof I affix my signature.

FREDERICK E. COMSTOCK.